US 7,912,296 B1

(12) United States Patent
Zelinka et al.

(10) Patent No.: US 7,912,296 B1
(45) Date of Patent: Mar. 22, 2011

(54) COVERAGE MASK GENERATION FOR LARGE IMAGES

(75) Inventors: Stephen D. Zelinka, Mountain View, CA (US); Emil C. Praun, Fremont, CA (US)

(73) Assignee: Google Inc., Mountain View, CA (US)

( * ) Notice: Subject to any disclaimer, the term of this patent is extended or adjusted under 35 U.S.C. 154(b) by 980 days.

(21) Appl. No.: 11/415,960

(22) Filed: May 2, 2006

(51) Int. Cl.
*G06K 9/62* (2006.01)

(52) U.S. Cl. ........................................ 382/209; 345/626

(58) Field of Classification Search .................. 382/100, 382/181, 190, 195, 209, 217, 218, 219; 358/217; 345/625, 626
See application file for complete search history.

(56) References Cited

U.S. PATENT DOCUMENTS

| | | | |
|---|---|---|---|
| 2,818,211 A | | 12/1957 | Macklem |
| 5,581,637 A | | 12/1996 | Cass et al. |
| 5,652,717 A | | 7/1997 | Miller et al. |
| 5,778,092 A | * | 7/1998 | MacLeod et al. .............. 382/176 |
| 5,796,868 A | * | 8/1998 | Dutta-Choudhury ......... 382/199 |
| 5,987,189 A | | 11/1999 | Schmucker et al. |
| 6,005,978 A | * | 12/1999 | Garakani ....................... 382/218 |
| 6,075,567 A | | 6/2000 | Ohnishi |
| 6,075,905 A | | 6/2000 | Herman et al. |
| 6,188,804 B1 | | 2/2001 | Weldy et al. |
| 6,313,837 B1 | | 11/2001 | Assa et al. |
| 6,326,965 B1 | | 12/2001 | Castelli et al. |
| 6,359,617 B1 | | 3/2002 | Xiong |
| 6,434,265 B1 | | 8/2002 | Xiong et al. |
| 6,453,233 B1 | | 9/2002 | Kato |
| 6,470,265 B1 | | 10/2002 | Tanaka |
| 6,470,344 B1 | | 10/2002 | Kothuri et al. |
| 6,493,021 B1 | | 12/2002 | Rouge et al. |
| 6,526,176 B1 | | 2/2003 | Kovacevic et al. |
| 6,591,004 B1 | * | 7/2003 | VanEssen et al. .............. 382/154 |
| 6,625,611 B1 | | 9/2003 | Teig et al. |
| 6,684,219 B1 | | 1/2004 | Shaw et al. |
| 6,694,064 B1 | | 2/2004 | Benkelman |
| 6,720,997 B1 | | 4/2004 | Horie et al. |
| 6,732,120 B1 | | 5/2004 | Du |
| 6,735,348 B2 | | 5/2004 | Dial, Jr. et al. |
| 6,757,445 B1 | | 6/2004 | Knopp |
| 6,766,248 B2 | | 7/2004 | Miyahara |
| 6,842,638 B1 | * | 1/2005 | Suri et al. ........................ 600/425 |
| 6,882,853 B2 | | 4/2005 | Meyers |
| 6,985,903 B2 | | 1/2006 | Biacs |
| 7,138,998 B2 | | 11/2006 | Forest et al. |
| 7,190,839 B1 | | 3/2007 | Feather et al. |
| 7,248,965 B2 | | 7/2007 | Tanizaki et al. |

(Continued)

OTHER PUBLICATIONS

Cindy Grimm, Creating View-dependent Texture Maps, 2002, Technical Report Sep. 2002, Washington University in St. Louis.*

(Continued)

*Primary Examiner* — Anand Bhatnagar
(74) *Attorney, Agent, or Firm* — Fish & Richardson P.C.

(57) ABSTRACT

A computer-implemented method is described. The method includes generating a coarse resolution image from a finer resolution image, generating a coarse coverage mask that identifies valid and non-valid data in the coarse resolution image, and determining whether data in the finer resolution image is valid or non-valid data based on whether corresponding data identified by the coarse coverage mask is valid or non-valid data. In certain embodiments, generating a coarse resolution image can include segmenting the finer resolution image into tiles and compressing each tile. Compressing each tile can be preformed using a lossless compression, and at least two tiles can be transmitted to separate computing devices and compressed in parallel.

46 Claims, 9 Drawing Sheets

U.S. PATENT DOCUMENTS

| | | | |
|---|---|---|---|
| 7,298,869 B1* | 11/2007 | Abernathy | 382/108 |
| 7,490,084 B2 | 2/2009 | Kothuri et al. | |
| 7,519,603 B2 | 4/2009 | Parker | |
| 7,552,008 B2 | 6/2009 | Newstrom et al. | |
| 7,561,156 B2 | 7/2009 | Levanon et al. | |
| 2001/0039487 A1 | 11/2001 | Hammersley et al. | |
| 2002/0101438 A1 | 8/2002 | Ham et al. | |
| 2002/0141640 A1* | 10/2002 | Kraft | 382/167 |
| 2002/0163582 A1 | 11/2002 | Gruber et al. | |
| 2003/0114173 A1 | 6/2003 | Carroll | |
| 2004/0021770 A1 | 2/2004 | Krill | |
| 2004/0057633 A1 | 3/2004 | Mai et al. | |
| 2004/0081355 A1* | 4/2004 | Takahashi | 382/165 |
| 2004/0095343 A1 | 5/2004 | Forest et al. | |
| 2004/0234162 A1 | 11/2004 | Jalobeanu et al. | |
| 2004/0252880 A1 | 12/2004 | Takizawa et al. | |
| 2005/0041842 A1 | 2/2005 | Frakes et al. | |
| 2005/0091223 A1 | 4/2005 | Shaw et al. | |
| 2005/0265631 A1 | 12/2005 | Mai et al. | |
| 2005/0270311 A1 | 12/2005 | Rasmussen et al. | |
| 2006/0143202 A1 | 6/2006 | Parker | |
| 2006/0184519 A1 | 8/2006 | Smartt | |
| 2006/0222079 A1 | 10/2006 | Park et al. | |
| 2007/0182734 A1 | 8/2007 | Levanon et al. | |
| 2007/0276970 A1 | 11/2007 | Werner et al. | |
| 2009/0074275 A1 | 3/2009 | O Ruanaidh | |

OTHER PUBLICATIONS

Barroso, Luiz Andre et al., "Web Search For A Planet: The Google Cluster Architecture", IEEE Micro, IEEE Computer Society, Mar.-Apr. 2003.

Dean, Jeffrey, et al. "MapReduce: Simplified Data Processing on Large Clusters", Symposium on Operating System Design (OSDI), Dec. 6-8, 2004, San Francisco, California.

Foley, James D. et al., "Computer Graphics: Principals and Practice Second Edition in C", Addison-Wesley (2006), Ch. 15.

Ghemawat, Sanjay et al., "The Google File System", Association for Computing Machinery (ACM), 19th Symposium on Operating System Principles (SOSP), Oct. 19-22, 2003, Lake George, New York.

Lindstrom, Peter et al., "An Integrated Global GIS and Visual Simulation System", Mar. 1997. Georgia Institute of Technology: Graphics, Visualization & Usability Center. Technical Report GIT-GVU-97-07.

Keyhole 2 Fusion Version 2,3 manual. Keyhole, Inc., 2005, 195 pages.

Langicy, Richard, B. "The UTM Grid System," GPS World, Feb. 1998, pp. 46-50.

Lewder, J.K. el al., "Using Space-filling Curves for Multi-dimensional Indexing." Copyright: 2000, School of Computer Science and information Systems, Birkbeck College, University of London, Malet Street, London WCIE 7HX, United Kingdom,16 pages.

Mesick, H., Ioup, E., Sample, J., "A Faster Technique for the Transformation of Universal Transverse Mercator Projected Raster Images into a Geodetic Projection," Naval Research Laboratory Memorandum Report, Mar. 11, 2005, 1 pages.

Skodras, A., Christopoulos, C., Ebrahimi, T., "JPEG 2000 Still Image Compression Standard," IEEE Signal Processing Magazine, Sep. 2001, pp. 36-58.

\* cited by examiner

COVERAGE MASK GENERATION FOR LARGE IMAGES

TECHNICAL FIELD

The disclosed implementations are generally related to image processing.

BACKGROUND

Dramatic improvements in computer processing power and broadband streaming technology have lead to the development of interactive three-dimensional (3D) map systems for navigating the Earth. Interactive 3D map systems typically provide a user interface (UI) with navigation controls for dynamically navigating cities, neighborhoods and other terrain. The navigation controls enable users to tilt, pan, rotate and activate 3D terrain and buildings for different perspectives at a point of interest.

The production imagery used by interactive 3D map systems is typically derived by processing large pieces of geo-located imagery or "assets," which can be taken from a single pass of a satellite or stitched together from multiple aerial photos. Once the imagery is processed it can be moved to datacenters where it can be distributed to other devices. To ensure that accurate 3D maps are generated, the production imagery is periodically updated in the datacenters. Unfortunately, the updating of large-scale satellite imagery (and terrain data) for the entire Earth can be a time consuming and laborious process.

SUMMARY

The implementations described in the specification relate to coverage mask generation for large images.

In a first general aspect, a computer-implemented method is described. The method includes generating a coarse resolution image from a finer resolution image, generating a coarse coverage mask that identifies valid and non-valid data in the coarse resolution image, and determining whether data in the finer resolution image is valid or non-valid data based on whether corresponding data identified by the coarse coverage mask is valid or non-valid data.

In certain embodiments, generating a coarse resolution image can include segmenting the finer resolution image into tiles and compressing each tile. Compressing each tile can be preformed using a lossless compression, and at least two tiles can be transmitted to separate computing devices and compressed in parallel.

In other embodiments, the tiles can be recombined to form the coarse resolution image. Generating the coarse coverage mask can include flood-filling the coarse resolution image with a value indicating non-valid data. Generating the coarse coverage mask can further include preventing the flood-filling from assigning non-valid data values unless an amount of pixels identified for flood-filling is greater than a hole size threshold, which identifies the pixels as non-valid data in the image portion instead of shadows comprising valid data.

In a second general aspect, a system is described. The system includes a compression engine to compress a high-resolution image into a coarse resolution image, a coarse coverage mask generator to generate a coverage mask by assigning valid or non-valid statuses to data in the coarse resolution image, and means for applying the mask to the high-resolution image to determine validity or non-validity statuses of data in the high-resolution image. The system can further include a segmenter to segment the high-resolution image into tiles that are separately compressed by the compression engine.

The systems and techniques described here may provide one or more of the following advantages. First, parallel processing of a full sized image mask may be accomplished, which may reduce processing time as well as the cost and complexity of the system. Second, arbitrary holes in an image that contain no-data values may be accurately identified. Third, a system may identify shadows as valid data values and prevent the system from assigning no-data values to these areas. Fourth, a system may identify compression artifacts in an image and mark them as no-data pixels even if the artifact's corresponding pixel values are slightly offset from a value used to determine no-data values.

The details of one or more implementations are set forth in the accompanying drawings and the description below. Other features, aspects, and advantages of the described implementations will be apparent from the description and drawings, and from the claims.

DESCRIPTION OF DRAWINGS

Like reference symbols in the various drawings indicate like elements.

DETAILED DESCRIPTION

Valid Data Identification System

When image data, or image assets, are processed for Earth mapping systems, the image data can be downsampled to provide mapping views at several different resolutions. When an image is downsampled, some or all of the image data may be averaged; however, if the image data contains pixels with no-data values (where the presences of the no-data values indicates that the data at that pixel is not valid), the averaging can produce artifacts in the resulting downsampled image.

A coverage mask can identify the areas with no-data values so that the areas can be processed appropriately. For example, the coverage map may identify areas of no-data values so that the areas are excluded from averaging processes that might produce artifacts in resultant downsampled images.

A coverage mask can be generated using a coarse, or low, resolution image asset. In some implementations, minified, or compressed, sections of the image (e.g., tiles) are combined to form a minified, or coarse resolution, asset. A computer system can perform a flood-fill process where areas of no image data can be identified by a pixel value (e.g., color indicator) of the coarse image pixel. The coverage mask can indicate areas in the image asset that contain valid image data or no-data values.

After the coverage mask is generated, it can be applied to high-resolution images sections which correspond to the minified, or compressed, sections of the image asset (e.g., the high resolution images from which to the minified, or compressed, sections were derived). A processing device may use the coverage mask to identify areas of the high-resolution images that include no-data values that should not be used in various image processing operations, e.g., in downsampling. The context in which the coverage mask can be used and more details about the generation of the coverage mask are described below.

Figure 1:
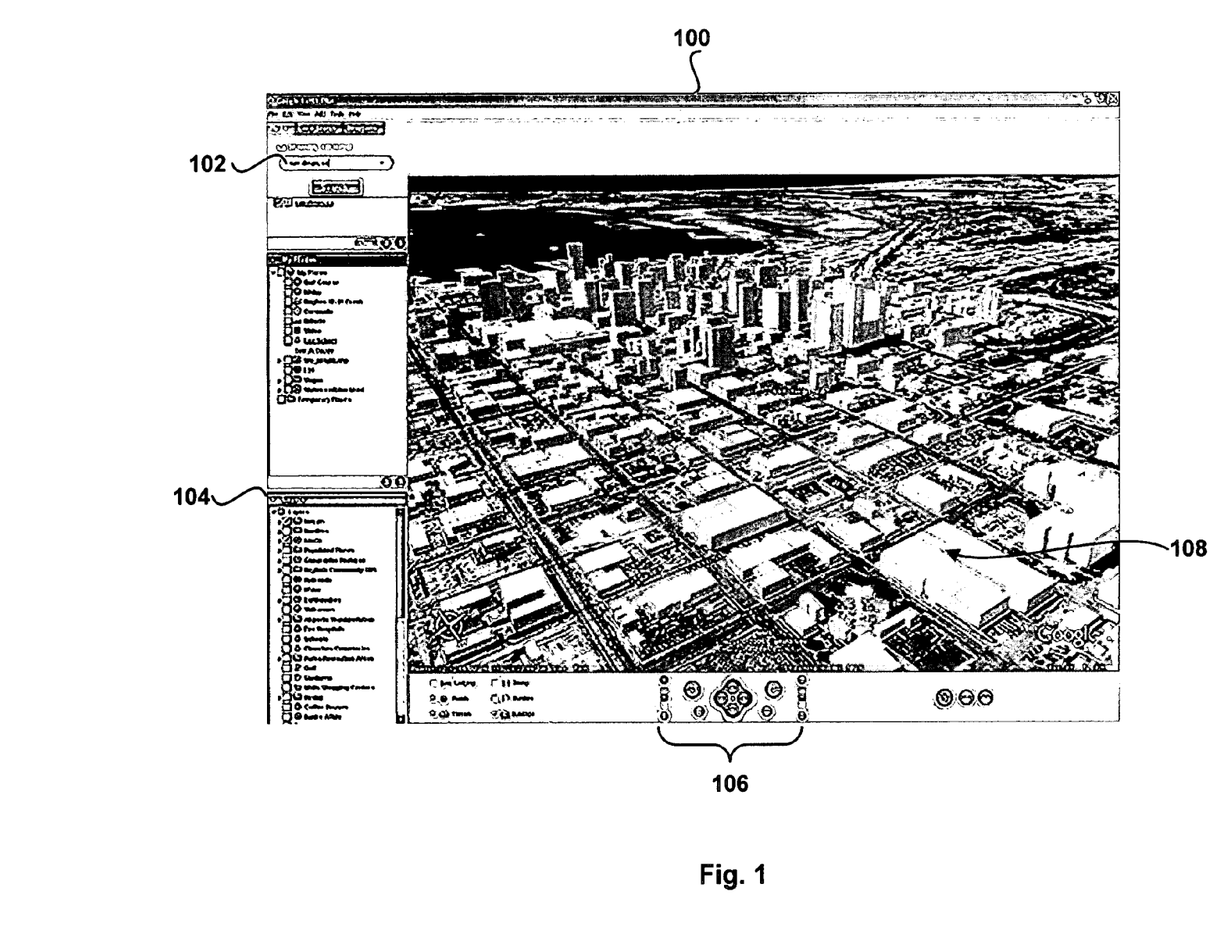
FIG. 1 is a screen shot of an example of a user interface for an interactive 3D Earth mapping system.

FIG. 1 is a screen shot of an example of a user interface (UI) 100 for an interactive 3D Earth mapping system. An example of an Earth mapping system is Google Earth™, developed by Google Inc. (Mountain View, Calif.). A client application running on a user device can provide the UI 100. The UI 100 allows a user to enter a desired location in a search box 102, and then presents imagery of the selected location in a display area 108. The user can also specify one or more layers of information to be displayed with the imagery (e.g., terrain, dining, lodging, gas stations, park and recreation areas, airports and transportation, etc.). The user can operate navigation controls 106 to tilt, pan, rotate and zoom imagery presented in the display area 108 to change the perspective of the selected location.

In some implementations, the client application on the user device communicates with one or more datacenters over a network (e.g., the Internet, an intranet, a wireless network). The user device receives navigation commands and other input from the user and retrieves imagery and associated meta-data from one or more server systems in the datacenters. Such a client/server architecture reduces the amount of data that a given user device stores locally to operate the interactive mapping system. The imagery provided by the data centers can be generated from raw satellite imagery and other information (e.g., terrain data, vector data, etc.) which is processed before being served to user devices, as described with respect to FIG. 2.

Image Processing and Delivery System

Figure 2:
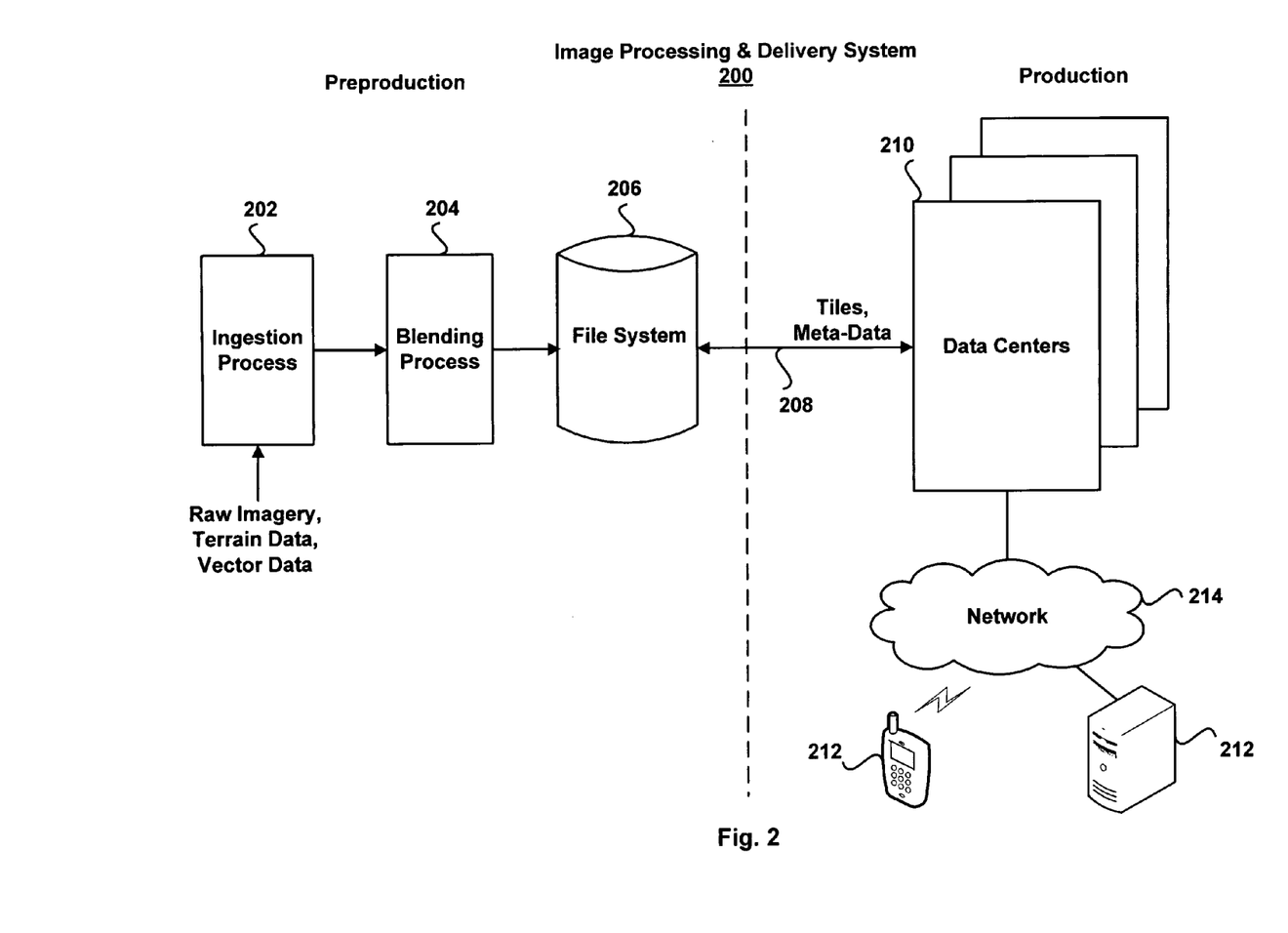
FIG. 2 is a block diagram of an example of an image processing and delivery system for processing and delivering map imagery to user devices.

FIG. 2 is a block diagram of an example of an image processing and delivery system 200 for processing and delivering map imagery and associated meta-data to user devices 212. In some implementations, the system 200 includes a preproduction phase and a production phase. The preproduction phase includes an ingestion process 202 and a blending process 204. The ingestion process 202 performs various image processing on raw imagery, including but not limited to: re-projection, tile generation, mask generation and multi-resolution pyramid building. Each of these processes is described more fully in reference to FIG. 3.

The processed imagery resulting from the ingestion process 202 is blended into image products which are made available to datacenters 210 through a file system 206 and a delivery channel 208. In some implementations, the preproduction phase is implemented using mass parallelization techniques, as described in reference to FIG. 3.

In the production phase, one or more data centers 210 retrieve the image products from the file system 206 and deliver the image products to user devices 212 through a data communication network 214, which can include, for example, the Internet, an intranet, or a wireless network. The image products can include imagery and associated meta-data for one or more locations on the Earth. The file system 206 can be the Global File System (GFS), described in Ghemawat, Sanjay et al., "The Google File System," Association for Computing Machinery (ACM), 19th Symposium on Operating System Principles (SOSP), Oct. 19-22, 2003, Lake George, N.Y., which article is incorporated by reference herein in its entirety.

User devices 212 can be any electronic device capable of displaying a map, including but not limited to: personal computers (portable or desktop), mobile phones, smart phones, personal digital assistants (PDAs), game consoles, high definition televisions, set-top boxes, navigation systems (e.g., global positioning system (GPS)), or avionics displays.

Exemplary Ingestion Process

Figure 3:
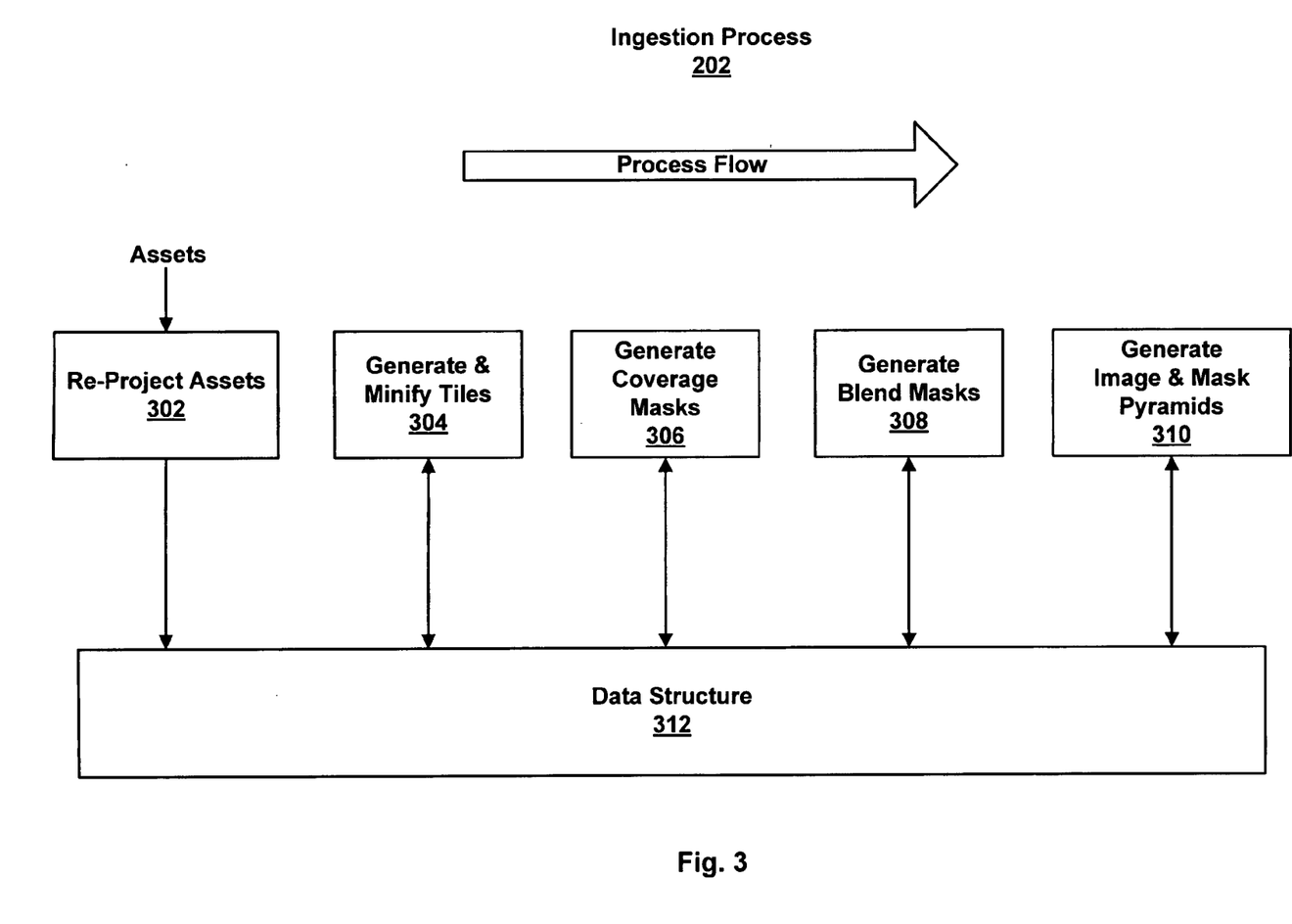
FIG. 3 is a flow diagram of an illustrative ingestion process.

FIG. 3 is a flow diagram of an illustrative ingestion process 202. This flow diagram illustrates in more detail an implementation of step 202 of FIG. 2. In some implementations, the ingestion process 202 is implemented in a parallel image-processing infrastructure, which can include hundreds or thousands of commodity computers that can be configured to perform image-processing operations in parallel.

Large pieces of geo-located imagery can be taken from a single pass of a satellite or are stitched together from multiple aerial photos. These raw images or assets can be received from one or more sources and can have a variety of orientations. The assets can be re-projected 302 into a suitable coordinate system for the map system (e.g., a geospatial coordinate system) and stored, e.g., in a data structure 312.

In some implementations, the re-projected assets are diced into multiple sections, or tiles 304, suitable for parallel processing, such that each tile can be processed independently. Ideally, tiles are stored so that tiles that include imagery for geographic locations that are close to each other have a high probability of being stored on the same machine or in the same machine cluster to reduce the overhead associated with accessing information located on multiple machines.

In some implementations, after an asset is re-projected and diced into tiles, the tiles are minified (e.g., down-sampled) to a coarse resolution image and stored in the data structure 312 (e.g., a table or other data structure). The size of a minified tile can be selected so that the minified tile can fit in the memory of a single machine to facilitate efficient parallel processing, as previously described.

As discussed above, a coverage mask can be generated 306 for each minified tile and stored in the data structure 312. The coverage mask identifies pixels in the tile that contain imagery. A coverage mask can be, for example, a binary file that contains a binary number for each pixel in a processing tile. A binary "1" can indicate the presence of imagery in a pixel and a binary "0" can indicate the absence of imagery in a pixel. When the coverage mask is applied to its associated processing tile, the pixels that do not contain imagery are masked out.

After the coverage masks are generated, blend masks for each tile can be generated 308 from the coverage masks and stored in the data structure 312. The blend masks can be used to feather the boundaries of high-resolution imagery against coarser resolution imagery. The feathering can be refined by using fragments from coverage masks associated with neighboring tiles. After the coverage and blending masks are generated, multi-resolution image and mask pyramids are generated 310 for multiple levels of resolution.

Figure 4A:
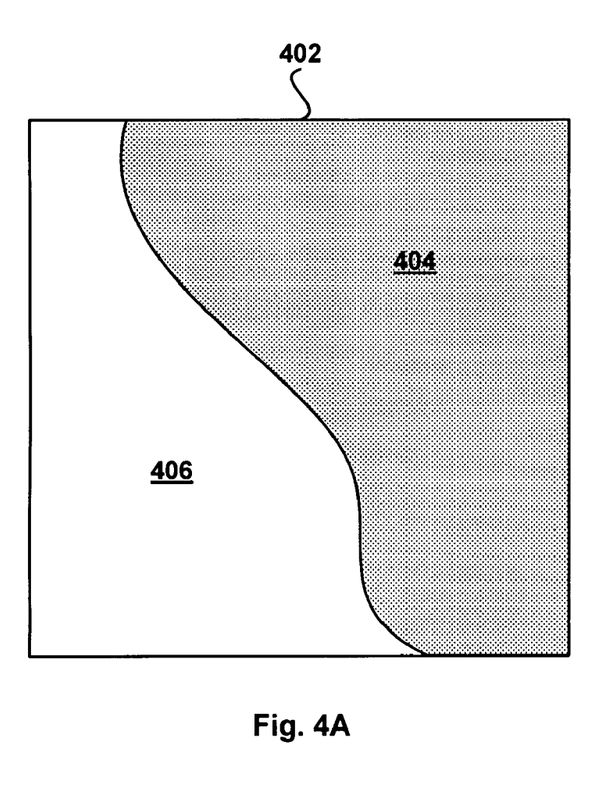
FIGS. 4A and 4B further illustrate the tile generation process 304.
Figure 4B:
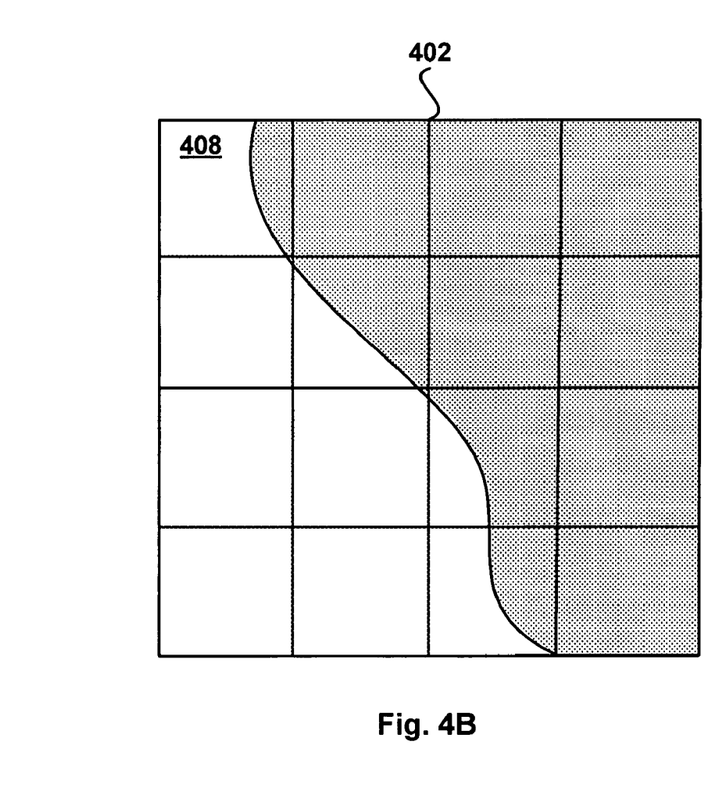

FIGS. 4A and 4B further illustrate one implementation of the tile generation process 304. A typical asset 402 can include a data region 404 (e.g., imagery) and a no-data region 406. The asset 402 can be diced into tiles 408 as shown in FIG. 4B. Note that tiles 408 can include data regions 404, no-data regions 406 or a mix of data regions 404 and no-data regions 406. It is typically not desirable to process no-data regions 406 because such regions can result in poor image quality, such as image artifacts. The removal of no-data regions 406 from further processing can be achieved using coverage masks. Generation of these coverage masks is discussed in greater detail in association with the remaining figures.

Exemplary Coverage Mask Generation

Figure 5:
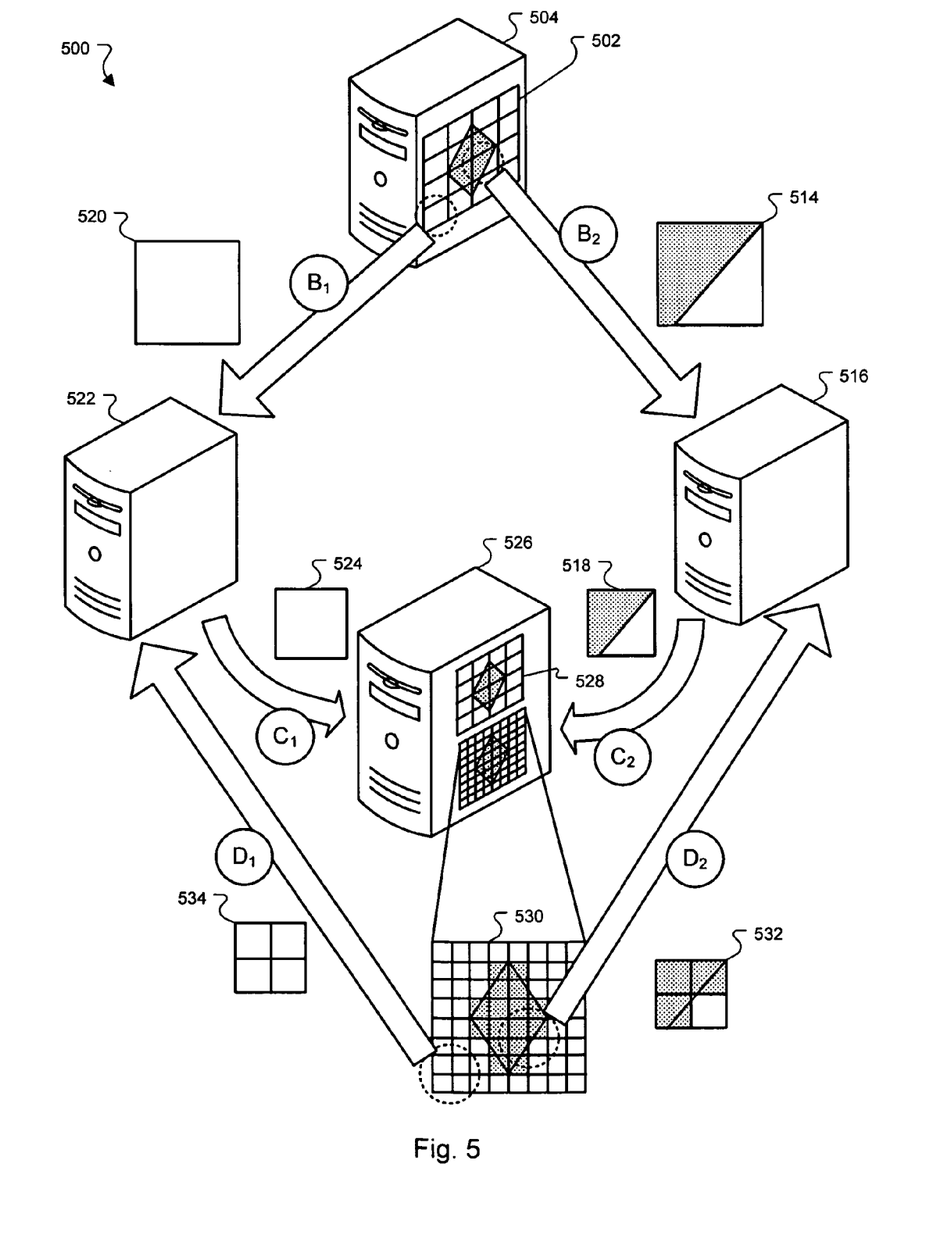
FIG. 5 is an example of a computer system having an asset, which has been divided into a set of high-resolution tiles.

FIG. 5 illustrates a system 500 that includes a computing device 504 having an asset 502, which has been divided into a set of high-resolution tiles including tiles 520, 514. As discussed above, the computing device 504 can distribute the individual high-resolution tiles to other machines, which hereinafter are referred to as computing devices, for parallel processing.

In some embodiments, the asset 502 is divided so that each tile can be processed individually on a single computing device. Each tile can be completely stored on a separate computing device, which may facilitate the processing of each tile without having to read or write any tile-related information from or to a different device. Additionally, all the information needed to process the tile may be stored within a cache of a computing device responsible for processing the tile. This may avoid problems arising from cache coherency because each machine does not need to access an external source to process the tile it stores.

A tile can contain both image data and no image data, such as the high-resolution tile 514. The high-resolution tile 514 can be transferred to a computing device 516 where a coarse resolution tile, which can also be referred to as a minified tile 518, is generated. For example, the device 516 can downsample the high-resolution tile 514 to generate the minified tile 518. The high-resolution tile 514 can be stored in the computing device 516 for future processing. Similarly, another tile, such as the high-resolution tile 520, can contain no-data values. The computing device 504 can transfer the high-resolution tile 520 to a computing device 522 where a minified tile 524 can be generated, and the high-resolution tile 520 can be stored in the device 522 for future processing.

A computing device 526 can generate a coarse resolution asset 528 by combining minified tiles received from multiple machines. For example, the computing device 526 receives a minified tile 524 from the computing device 516 and another minified tile 518 from the computing device 526. Additionally, it can receive the remaining minified tiles derived from the asset 502 from other computing devices (not shown) allowing it to construct a coarse resolution asset 528 consisting of minified tiles. In some implementations the high-resolution tiles and the coarse resolution tiles are stored in the data structure 312 discussed in reference to FIG. 3.

The coarse resolution asset 528 can be used to generate a coarse coverage mask 530 by flood-filling the asset 528 starting at areas that contain no-data values. In some implementations, the corner pixels of the coarse resolution asset 528 are assumed to contain no-data. In other implementations, different pixels of the coarse resolution asset 528 can be assumed to contain no-data. The assumption may be based on the source of the original asset. For example, some asset providers may generate assets that contain no-data pixels at certain locations in the asset. The system 500 may base the assumption of which pixels have no-data values on which source provides the image. Additionally, the assumption may be based on how the asset is re-projected. For example, if the asset is re-projected based on a geospatial coordinate system, the corner pixels may be assumed to hold no-data values.

The flood-fill algorithm may use several parameters, such as a seed pixel and a replacement pixel value. In some implementations, the flood-fill may begin at a corner pixel of the coarse resolution asset 528 which may be assumed to contain no-data. The corner pixel in this case would be the seed pixel at which the algorithm begins the flood-fill.

The flood-fill algorithm can determine the pixel values (e.g., the color or color gradient) of pixels that surround the seed pixel to determine if the surrounding values are the same as the value of the seed pixel. In some implementations, the algorithm examines the seed value's adjoining four-connected pixel neighbors (e.g., it does not look at pixels diagonally positioned from the seed pixel) and determines if the color of the adjoining pixel is the same as the color of the seed pixel.

If the color of the adjoining pixel is the same as the color of the seed pixel, the adjoining pixel color is changed to a replacement pixel value, which is a predetermined value that may indicate a status (e.g., no valid data status).

In some implementations, the adjoining pixel color is changed even if it is not the same color as the seed pixel. For example, the flood-fill algorithm may use a range of values, or a tolerance level, to determine whether to replace the adjoining pixel value. If the pixel value is within the tolerance level of the seed pixel value, the adjoining pixel value can be replaced. In some implementations, the seed pixel color and the replacement pixel value may be the same color. In other implementations, the replacement pixel value may be a value used to mask the data, such as a "0." Use of the tolerance level may avoid identifying compression artifacts (which may be generated by the compression of the tile or may be present in the original asset) as valid data because they vary slightly from the no-data value.

A flood-fill can start from the no-data pixels to determine the no-data region in the coarse resolution asset 528. The flood-fill proceeds through any pixel in the coarse resolution asset 528 that is within the no-data tolerance. For example, a no-data pixel may be determined to be black. The data value for a black pixel can be zero. The tolerance level for the no-data pixel can be set to five. Therefore any pixel with a value of five or less (e.g., close to the color black) can be considered a no-data pixel.

The flood-fill can take into account multiple channels, e.g., red, green and blue (RGB), when it makes a no-data determination. For example, the color value "red" may be defined as the no data color, where red is defined as an RGB triplet (255, 0, 0). The flood-fill can access the values of each of the color components for a pixel and can determine if the pixel is no-data if the red component is 255, the green component is 0, and the blue component is 0. In other embodiments, the pixel can be expressed with fewer or more than three color channels, and the channels can have interpretations other than red/green/blue.

The result of the flood-fill algorithm can be the coarse coverage mask 530, which identifies areas in the asset where image data and no-data are located. The coarse coverage mask 530 can be sectioned into coarse coverage mask tiles, such as the tiles 532, 534, each of which correspond to a minified tile of the coarse resolution asset 528.

The coarse coverage mask tiles can be transmitted to the computing device that stores the corresponding high-resolution tile. In some implementations, each machine can process its stored high-resolution tile using the coverage mask tiles without needing to access additional information from other computing devices.

For example, the coarse coverage mask tile 532 can correspond to the minified tile 518. The coarse coverage mask tile 532 for the minified tile 518 can be transferred to the computing device 516 that contains the high-resolution tile 514 which generated the minified tile 532. Here, the computing device 516 can use the coarse coverage mask tile 532 in a refinement process to determine image data boundary areas if the coarse coverage mask tile indicates it covers an area including both data and no-data values (which is the case with the tile 532).

Similarly, the coarse coverage mask tile 534 can correspond to the minified tile 524. The coarse coverage mask tile 534 for the minified tile 524 can be transferred to the computing device 522 that contains the high-resolution tile 520 which was used to generate the minified tile 534, and the device 522 can use the coarse coverage mask tile 534 to determine if the corresponding high-resolution tile 520 contains valid data, no-data values, or a combination thereof. In this case, the coverage mask tile 534 indicates that the high-resolution tile contains only no-data values. The system 500 can use this indication to ensure that the pixels included in the high-resolution tile 520 are not processed in certain algorithms, such as downsampling.

Figure 6:
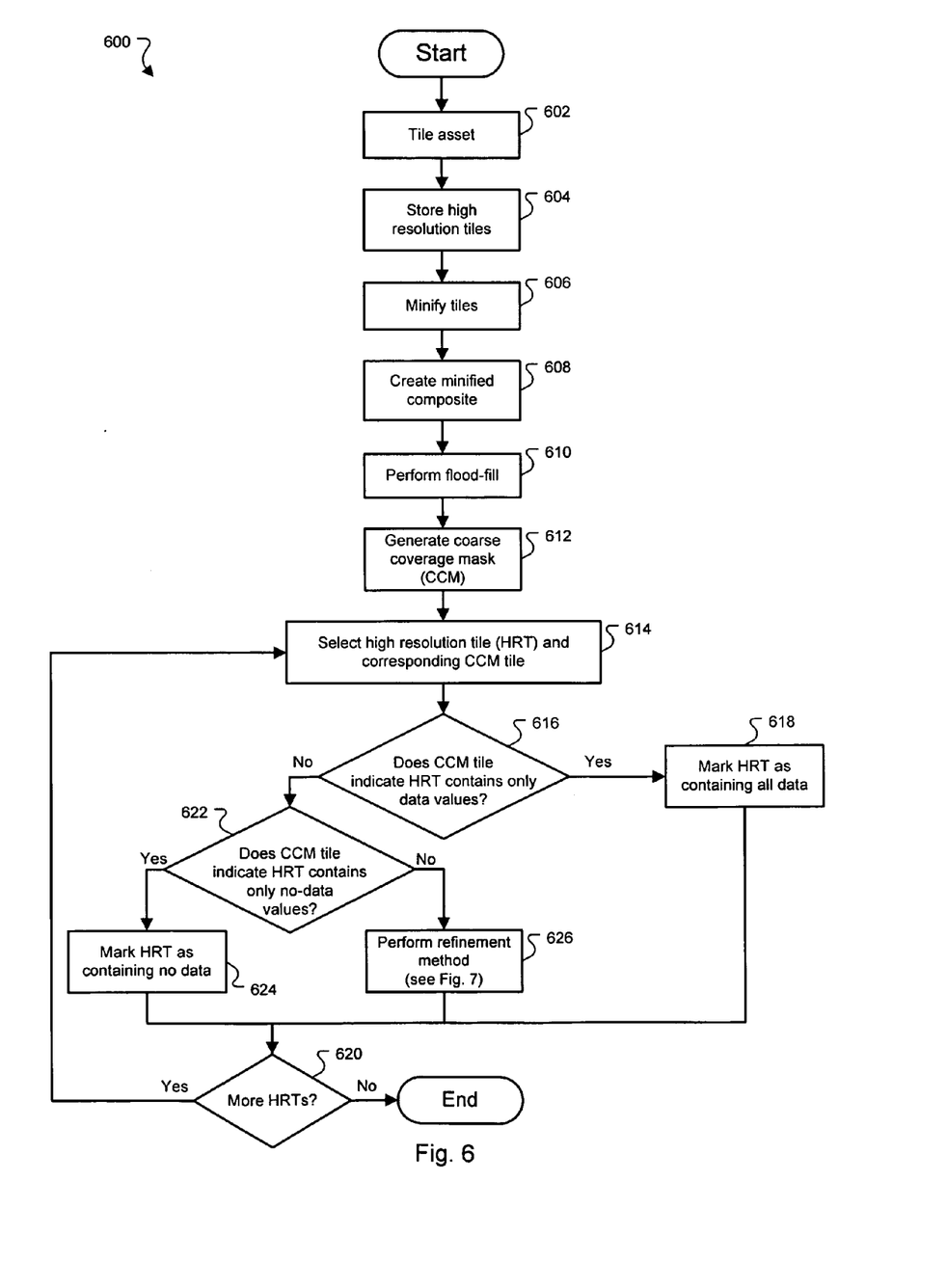
FIG. 6 is a flow chart of an exemplary method for the generation of a coverage mask for an asset at an image's natural resolution.

FIG. 6 is a flow chart of an exemplary method 600 for the generation of a coverage mask for an asset at an image's natural resolution. The method 600 can begin during the ingestion process 202 of the image processing and delivery system 200, as described with reference to FIGS. 2 and 3. The method 600 starts when an asset is diced, or tiled, into multiple high-resolution tiles 602. FIG. 5 shows an asset that has been diced into a set of high-resolution tiles 502. The high-resolution tiles may be suitable for parallel processing, such that each tile can be processed independently by separate processing units.

In some embodiments, the tiles are square or rectangular shapes of the same size. This may increase the efficiency of processing the tiles. For example, if the size is a fixed rectangle, the system can iterate from one pixel to the next without having to calculate where the next pixel is located. Additionally, the system may locate surrounding, or neighboring, pixels with minimal overhead because the locations of the neighboring pixels can be predefined. In other embodiments, the tiles are in other shapes or may vary in size and shape. The system can determine where the pixels are before or during processing.

Next, the high-resolution tiles are stored on a computing device 604. Each high-resolution tile may be stored on the same computing device that generated the tile or it may be stored on another computing device in the same machine cluster or outside of the machine cluster. For example, as shown in FIG. 5, the high-resolution tile 514 generated by computing device 504 is transmitted to and stored in computing device 516.

Minified tiles are then generated 606 from the high-resolution tiles and stored in the data structure 312, as described in reference to FIG. 3. For example, the minified tile 518 is generated from the high-resolution tile 514 by computing device 516. Similarly, the minified tile 524 is generated from the high-resolution tile 520 by computing device 522. The size of a minified tile can be selected so that the minified tile can fit in the memory of a single computing device. It also may be desirable to minimize compression artifacts in a minified tile. In some implementations, the presence of artifacts may be reduced by using a lossless compression image format (e.g., Portable Network Graphics (PNG)) to generate the minified tile. Using a lossy compression image format, for example Joint Photographic Experts Group (JPEG) compression, may create artifacts in the minified tiles.

A computing device, for example the computing device 526 shown with reference to FIG. 5, may create a minified composite of an asset 608, which may be referred to as a coarse resolution asset. For example, the computing device 526 creates the coarse resolution asset 528 from the minified tiles 524 and 518, as well as other minified tiles.

A flood-fill can be performed 610 on the coarse resolution asset. Part of the flood-fill can included detecting "holes" in the coarse resolution asset. For example, a hole may be an area that contains apparently no-data values, where the hole is surrounded or partially surrounded by valid data values. An identified hole may be an area that in fact contains no-data values or it may be an area that appears as no-data values, but actually has valid data.

For example, an identified hole may be shadows in the images, such as the shadows cast by buildings. Using a tolerance level to detect no-data pixels may have an unintended consequence of identifying the shadows (e.g., cast by mountains, buildings, etc.) as no-data pixels. Setting a threshold size for holes may prevent erroneously identifying valid data (e.g., shadows) as no data sections of the image because true data holes (e.g., the holes that can result from combining several separate images) typically may be larger than the threshold. A user, therefore, can specified a hole size so that only holes of at least the specified size are identified and treated as no-data areas in the asset. This may prevent identifying shadows in the asset as areas of no-data pixels. If a selected pixel is part of a hole, which exceeds the maximum hole threshold size, the system can perform a flood-fill on the hole.

The result of the flood-fill on the coarse resolution asset (including any identified holes) can be used to generate a coarse coverage mask (CCM). A portion of the CCM can be identified for each minified tile of the coarse resolution asset. For example, the computing device 526 can perform a flood-fill on the coarse resolution asset 528 generating the coarse coverage mask 530. The CCM portion 532 is identified for the minified tile 518. Similarly, the CCM portion 534 is identified for the minified tile 524.

As described in association with FIGS. 4A and 4B, the CCM may be a file that contains a binary number for each pixel in the coarse resolution asset. A binary "1" can indicate a data pixel and a binary "0" can indicate a no-data pixel. When the CCM portion is mapped to its associated high-resolution tile, the pixels that contain no-data are masked out. In this way, the CCM can be used to identify high-resolution tiles that contain all data, all no-data or a combination of both.

Next a high-resolution tile (HRT) is selected and its corresponding CCM portion is determined 614. Then, the system determines if the CCM portion indicates that its corresponding HRT contains only data values 616. If yes, the HRT is flagged, or recorded, as containing all data values 618. The system then determines if there are any remaining high-resolution tiles (HRTs) in the asset to be selected 620. If yes, the method 600 continues by selecting another HRT and determining its corresponding CCM portion 614. If no, the method 600 ends.

If the system determines that the CCM portion indicates that its corresponding HRT does not contain only data values 616, it determines if the CCM portion indicates that its corresponding HRT contains only no-data values 622. If yes, the HRT is marked as containing all no-data values 624. If there are more HRTs 620, the method 600 continues by selecting another HRT and determining its corresponding CCM portion 614. If there are no more HRTs, the method 600 ends.

If it is determined that the CCM portion indicates that its corresponding HRT contains both data and no-data values 622, a refinement method can be performed, which will be described in more detail in FIG. 7. After the refinement process is performed, if there are more HRTs 620, the method 600 continues, another HRT is selected, and its corresponding CCM portion is determined 614. If no, the method 600 ends.

Figure 7:
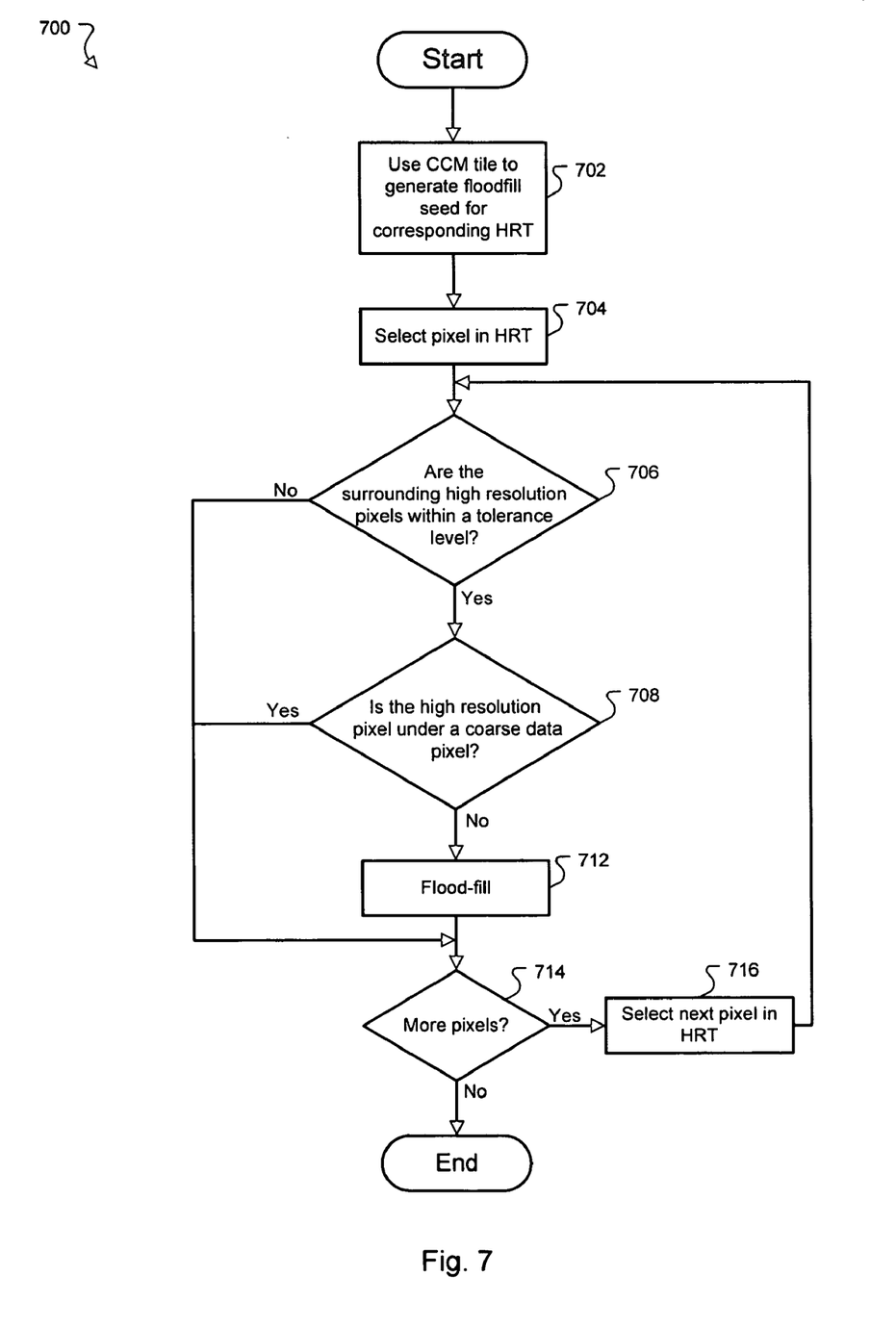
FIG. 7 is a flowchart of an exemplary method for a refinement step used in the method of FIG. 6.

FIG. 7 is a flowchart of an exemplary method 700 for a refinement step used in the method of FIG. 6. The method 600, as described with reference to FIG. 6, can determine whether a CCM portion contains both data and no-data values 622. The method 600 then performs a refinement flood-fill method in step 626, such as the method 700.

The refinement method can begin by computing a tri-level mask from the CCM. Each coarse pixel in the CCM becomes a coarse data pixel, a coarse no-data pixel, or a coarse boundary pixel. The coarse boundary pixel can be determined based upon whether all of its four-connected neighbor coarse pixels (e.g., pixels that are not located on a diagonal) are in agreement with it. Several high resolution pixels are covered by a single coarse pixel. If a coarse pixel is marked as containing valid data, the corresponding high-resolution pixels that are covered by the coarse pixel in the tri-level mask are marked as including valid data. The refinement method also flags these high-resolution pixels as "processed."

Each coarse pixel marked as containing no-data values generates a seed used for starting a refinement flood-fill, which proceeds in a manner similar to the flood-fill algorithm used to create the CCM as shown in FIG. 6. The refinement flood-fill, however, can be limited to regions within one coarse level pixel of the no-data/data boundary—this limitation is explained in greater detail in reference to FIG. 8.

More specifically, the method 700 starts by using the CCM portion to generate a flood-fill seed for the corresponding HRT 702 to be used in a refinement flood-fill. Next, a pixel is selected in the HRT 704 that is covered by the coarse no-data pixel. It is then determined if the surrounding high resolution pixels are in agreement with it, within a tolerance level 706. The surrounding high resolution pixels can be defined as all of the pixel's four-connected neighbor pixels (i.e., pixels that are not located on a diagonal). For example, a no-data pixel may be determined to be black. The data value for a black pixel can be zero. The tolerance level for the no-data pixel can be set to five. Therefore any pixel with a value of five or less (e.g. close to the color black) will be considered a no-data pixel. If the high resolution pixels which surround the selected pixel are within the tolerance level, the system determines if the selected high resolution pixel is within one pixel of the boundary pixel 708.

If the high resolution pixel is not within one pixel, the flood-fill can be performed 712 using the selected pixel in the HRT as the seed. After the system selects a pixel, it may be marked, or flagged, as processed. If the high-resolution pixel is within one pixel of a boundary pixel, the system does not perform the flood-fill. Constraining the flood-fill in this way may limit the maximum erosion that can occur into valid data regions, such as shadows.

Next, the system determines if there are more unprocessed pixels in the HRT 714. If there are more pixels, the next pixel in the HRT is selected 716, and the method 700 continues with step 706. If there are no more pixels in the HRT, the method 700 ends.

Figure 8:
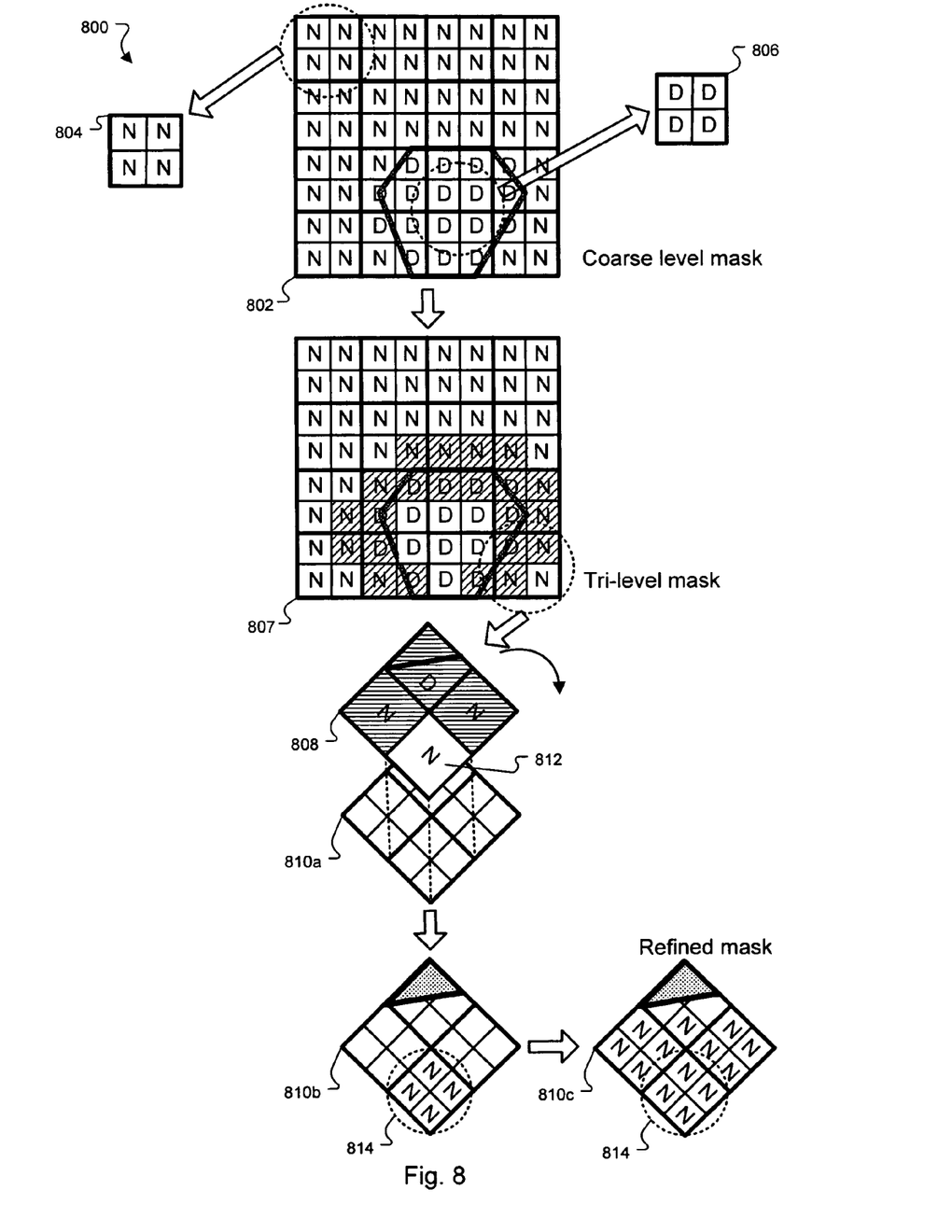
FIG. 8 is an example an application of the refinement step of FIG. 7.

FIG. 8 is an example an application of the refinement step of FIG. 7. The system can generate a CCM 802 from a coarse resolution asset, as described with reference to FIG. 5 and FIG. 6. The CCM may consist of CCM portions, examples of which are CCM portion 804 and CCM portion 806. A CCM portion can consist of coarse level pixels, which can correspond to several high-resolution pixels in a HRT. The CCM portion 804, for example, consists of four coarse no-data pixels (shown in FIG. 8 as "N"), and the CCM portion 806 consists of four coarse data pixels (shown in FIG. 8 as "D").

The system can generate a tri-level mask 807 from the CCM 802. The coarse pixels of the tri-level mask can be marked as data pixels, no-data pixels, and as boundary data (shown in FIG. 8 with diagonal striping). All of the high-resolution pixels corresponding to the valid data pixels, can be marked as having valid data pixels, and all of the high resolution pixels corresponding to the no-data pixels can be marked as having no-data pixels.

The system can determine if a coarse pixel should be marked as boundary data based upon whether all of a pixel's four-connected neighbors are marked with a similar data status (e.g., the neighboring pixels are either all data pixels or all no-data pixels).

The system may use the tri-level mask 807 to generate a refined mask for portions that include boundary data. The tri-level portion 808, shown rotated clockwise 90 degrees from its original orientation within the tri-level mask 807, includes three coarse boundary pixels and one coarse no-data pixel 812. The corresponding HRT for the tri-level portion is shown as HRT 810a.

The coarse level pixel 812 can be used as a seed for the refinement flood-fill of the HRT 810, as described with reference to FIG. 7. The high-resolution pixels in the HRT 810b are marked as no-data pixels 814.

The flood-fill initiated at the no-data pixels 814 fills the surrounding pixels that are within a no-tolerance level, as shown in 810c. However, as discussed in reference to step 708 of FIG. 7, the flood-fill does not fill pixels within one pixel level of a no-data boundary. This can produce a buffer consisting of unfilled pixels around the boundary, such as pixel 816.

The system can compile the areas marked as no-data areas (e.g., CCM portion 804), the areas marked valid data areas (e.g., the CCM portion 806), and the refined areas (e.g., the area 810c) into a coverage mask for the entire image at the image's natural resolution.

Exemplary Computer System

Figure 9:
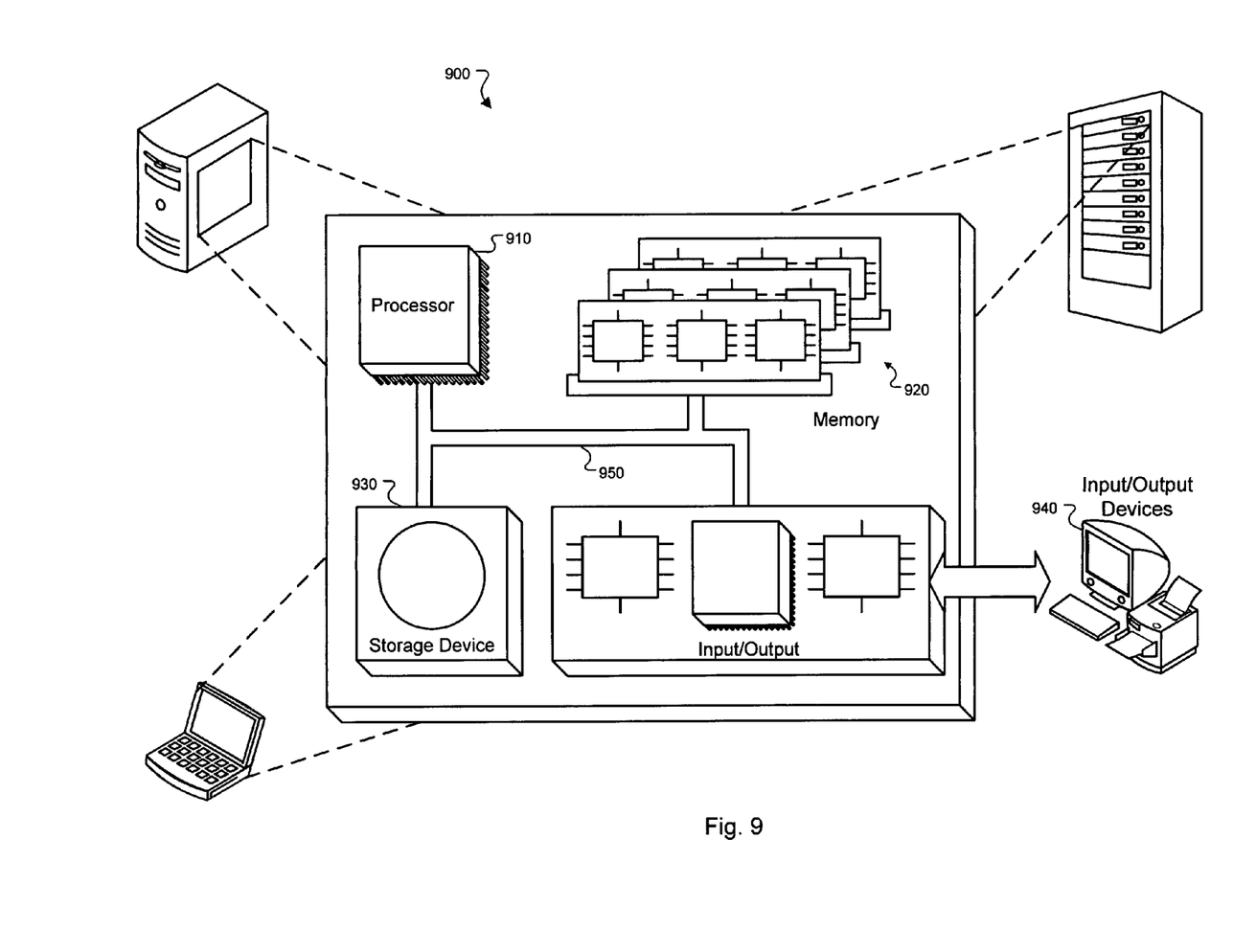
FIG. 9 is a schematic diagram of a general computer system.

The system 900 includes a processor 910, a memory 920, a storage device 930, and an input/output device 940. Each of the components 910, 920, 930, and 940 are interconnected using a system bus 990. The processor 910 is capable of processing instructions for execution within the system 900. For example, the processor 910 can be a microcontroller that executes instructions that carry out the methods 600 and 700. In some implementations, the processor 910 is a single-threaded processor. In other implementations, the processor 910 is a multi-threaded processor. The processor 910 is capable of processing instructions stored in the memory 920 or on the storage device 930. In some implementations, the processed instructions may generate graphical information for a user interface, on the input/output device 940.

The memory 920, which is a computer-readable medium, stores information within the system 900. In some implementations, the memory 920 is a volatile memory unit. In other implementations, the memory 920 is a non-volatile memory unit. The memory may be suitable for tangibly embodying computer program instructions and data. The instructions and data can be loaded into memory from an external source, such as the storage device 930 or the input/output device 940.

The storage device 930 is capable of providing mass storage for the system 900. In some implementations, the storage device 930 is a computer-readable medium. In various different implementations, the storage device 930 may be a floppy disk device, a hard disk device, an optical disk device, or a tape device.

The input/output device 940 provides input/output operations for the system 900. In some implementations, the input/output device 940 includes a keyboard and/or pointing device. In other implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The components of the system can be connected by any form or medium of digital data communication such as a communication network. Examples of communication networks include, e.g., a LAN, a WAN, and the computers and networks forming the Internet.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the described implementation. For example, the described implementations are not limited to the processing of satellite images, but used for other large collections of data, such as information obtained through data signal processing.

In other implementations, pixels are classified using a local no-data classifier, which classifies pixels as data or no-data pixels based on information local to the selected pixels, such as neighboring pixels. The no-data classifier does not have to access pixels outside a defined local area (which is relative to a pixel selected for classification) in order to classify the pixel within the area. For example, the classifier may determine how to classify a pixel based on the pixel's color. The classifier may make the classification with respect to a set of predefined no-data colors and related tolerances. In other examples, the classifier may determine how to classify a pixel based on the pixel's color gradient.

In other implementations, the computing devices shown in FIG. 5 may be located within one machine cluster, or group, or they may be located in separate machine clusters. Moreover, the processing one or more of the processing steps depicted in FIG. 5 may take place a single machine. Accordingly, other embodiments are within the scope of the following claims.

What is claimed is:

1. A computer-implemented method comprising:
   generating a coarse resolution image from a finer resolution image;
   generating a coarse coverage mask for the coarse resolution image that identifies valid and non-valid data in the coarse resolution image, wherein data is valid if it corresponds to image data, and data is invalid if it does not correspond to image data; and determining whether data in the finer resolution image is valid or non-valid data based on whether corresponding data identified by the coarse coverage mask is valid or non-valid data; and wherein the method is performed by one or more processors.

2. The method of claim 1, wherein generating a coarse resolution image includes segmenting the finer resolution image into tiles and compressing each tile.

3. The method of claim 2, wherein compressing each tile is performed using a lossless compression.

4. The method of claim 2, wherein at least two tiles are transmitted to separate computing devices and compressed in parallel.

5. The method of claim 4, wherein the tiles are recombined to form the coarse resolution image.

6. The method of claim 5, wherein generating the coarse coverage mask comprises flood-filling the coarse resolution image with a value indicating non-valid data.

7. The method of claim 6, wherein generating the coarse coverage mask further comprises preventing the flood-filling from assigning non-valid data values unless an amount of pixels identified for flood-filling is greater than a hole size threshold.

8. The method of claim 6, wherein the flood-filling is performed by a single computing device.

9. The method of claim 1, wherein determining whether the data in the finer resolution image is valid or non-valid data comprises assigning a valid status to a fine pixel value of the finer resolution image if the coarse coverage mask identifies a corresponding coarse pixel value as valid data.

10. The method of claim 1, wherein determining whether the data in the finer resolution image is valid or non-valid data comprises assigning a non-valid status to a fine pixel value of the finer resolution image if the coarse coverage mask identifies a corresponding coarse pixel value as non-valid data.

11. The method of claim 1, further comprising identifying a section of the coarse resolution image as boundary data if one adjacent section of the image includes valid data and another adjacent section of the image includes non-valid data, and including the identification of the boundary data in the coarse coverage mask.

12. The method of claim 11, further comprising generating a refined mask comprising selecting a portion of the finer resolution image corresponding to a portion of the coverage mask that includes the boundary data identification and initiating a flood-fill of non-valid data values in the selected portion of the finer resolution image at one or more pixels specified by the portion of the coverage mask as having non-valid data.

13. The method of claim 12, wherein generating the refined mask further comprises preventing the flood-fill from assigning non-valid data values to a second pixel in the image portion if the second location is within a predetermined measurement of the identified boundary data.

14. The method of claim 13, wherein the predetermined measurement includes one pixel of the selected portion of the finer resolution image.

15. The method of claim 12, wherein the flood-fill comprises identifying an original value at a pixel location, and filling it with a non-data value indicating the pixel contains non-valid data if the original pixel value is within a predetermined tolerance range.

16. The method of claim 15, wherein the flood-fill further comprises a four-way flood-fill that selects four pixels adjacent to a pixel that has been filled with the non-data value and fills each adjacent pixel with a non-data value if the adjacent pixel has a pixel value within the tolerance range.

17. The method of claim 1, wherein the finer resolution image is a composite image generated from separate finer resolution images.

18. A system comprising:
one or more computers programmed to perform operations comprising:
compressing a high-resolution image into a coarse resolution image;
generating a coarse coverage mask by assigning valid or non-valid statuses to data in the coarse resolution image, wherein data is valid if it corresponds to image data, and data is invalid if it does not correspond to image data; and
applying the mask to the high-resolution image to determine validity or non-validity statuses of data in the high-resolution image.

19. The system of claim 18, further programmed to perform operations comprising segmenting the high-resolution image into tiles that are separately compressed.

20. The system of claim 19, wherein at least two tiles are transmitted to separate computing devices and compressed in parallel.

21. The system of claim 18, wherein generating the coarse coverage mask comprises flood-filling the coarse resolution image with a value indicating non-valid data.

22. The system of claim 21, wherein generating the coarse coverage mask further comprises preventing the flood-filling from assigning non-valid data values unless an amount of pixels identified for flood-filling is greater than a hole size threshold.

23. The system of claim 18, wherein determining whether the data in the finer resolution image is valid or non-valid data comprises assigning a valid status to a fine pixel value of the finer resolution image if the coarse coverage mask identifies a corresponding coarse pixel value as valid data.

24. The system of claim 18, wherein determining whether the data in the finer resolution image is valid or non-valid data comprises assigning a non-valid status to a fine pixel value of the finer resolution image if the coarse coverage mask identifies a corresponding coarse pixel value as non-valid data.

25. The system of claim 18, further programmed to perform operations comprising identifying a section of the coarse resolution image as boundary data if one adjacent section of the image includes valid data and another adjacent section of the image includes non-valid data, and including the identification of the boundary data in the coarse coverage mask.

26. The system of claim 25, further programmed to perform operations comprising generating a refined mask comprising selecting a portion of the finer resolution image corresponding to a portion of the coverage mask that includes the boundary data identification and initiating a flood-fill of non-valid data values in the selected portion of the finer resolution image at one or more pixels specified by the portion of the coverage mask as having non-valid data.

27. The system of claim 26, wherein generating the refined mask further comprises preventing the flood-fill from assigning non-valid data values to a second pixel in the image portion if the second location is within a predetermined measurement of the identified boundary data.

28. The system of claim 26, wherein the flood-fill comprises identifying an original value at a pixel location, and filling it with a non-data value indicating the pixel contains non-valid data if the original pixel value is within a predetermined tolerance range.

29. The system of claim 28, wherein the flood-fill further comprises a four-way flood-fill that selects four pixels adjacent to a pixel that has been filled with the non-data value and fills each adjacent pixel with a non-data value if the adjacent pixel has a pixel value within the tolerance range.

30. A computer-readable storage device encoded with a computer program, the computer program including instructions that, when executed by data processing apparatus, cause the data processing apparatus to perform operations comprising:
compressing a high-resolution image into a coarse resolution image;
generating a coarse coverage mask that identifies non-valid data in the coarse resolution image, where non-valid data is data that does not correspond to image data; and
applying the coarse coverage mask to the high-resolution image to determine whether data in the high-resolution image is non-valid data based on whether corresponding data identified by the coarse coverage mask is non-valid data.

31. The storage device of claim 30, wherein generating a coarse resolution image includes segmenting the finer resolution image into tiles and compressing each tile.

32. The storage device of claim 31, wherein compressing each tile is performed using a lossless compression.

33. The storage device of claim 31, wherein at least two tiles are transmitted to separate computing devices and compressed in parallel.

34. The storage device of claim 33, wherein the tiles are recombined to form the coarse resolution image.

35. The storage device of claim 34, wherein generating the coarse coverage mask comprises flood-filling the coarse resolution image with a value indicating non-valid data.

36. The storage device of claim 35, wherein generating the coarse coverage mask further comprises preventing the flood-filling from assigning non-valid data values unless an amount of pixels identified for flood-filling is greater than a hole size threshold.

37. The storage device of claim 35, wherein the flood-filling is performed by a single computing device.

38. The storage device of claim 30, wherein determining whether the data in the finer resolution image is valid or non-valid data comprises assigning a valid status to a fine pixel value of the finer resolution image if the coarse coverage mask identifies a corresponding coarse pixel value as valid data.

39. The storage device of claim 30, wherein determining whether the data in the finer resolution image is valid or non-valid data comprises assigning a non-valid status to a fine pixel value of the finer resolution image if the coarse coverage mask identifies a corresponding coarse pixel value as non-valid data.

40. The storage device of claim 30, the operations further comprising identifying a section of the coarse resolution image as boundary data if one adjacent section of the image includes valid data and another adjacent section of the image includes non-valid data, and including the identification of the boundary data in the coarse coverage mask.

41. The storage device of claim 40, the operations further comprising generating a refined mask comprising selecting a portion of the finer resolution image corresponding to a portion of the coverage mask that includes the boundary data identification and initiating a flood-fill of non-valid data values in the selected portion of the finer resolution image at one or more pixels specified by the portion of the coverage mask as having non-valid data.

42. The storage device of claim 41, wherein generating the refined mask further comprises preventing the flood-fill from assigning non-valid data values to a second pixel in the image portion if the second location is within a predetermined measurement of the identified boundary data.

43. The storage device of claim 42, wherein the predetermined measurement includes one pixel of the selected portion of the finer resolution image.

44. The storage device of claim 41, wherein the flood-fill comprises identifying an original value at a pixel location, and filling it with a non-data value indicating the pixel contains non-valid data if the original pixel value is within a predetermined tolerance range.

45. The storage device of claim 44, wherein the flood-fill further comprises a four-way flood-fill that selects four pixels adjacent to a pixel that has been filled with the non-data value and fills each adjacent pixel with a non-data value if the adjacent pixel has a pixel value within the tolerance range.

46. The storage device of claim 30, wherein the finer resolution image is a composite image generated from separate finer resolution images.

* * * * *